United States Patent
Spaeder, Jr.

[11] 3,861,012
[45] Jan. 21, 1975

[54] COMPOSITE ROLL AND METHOD OF FORMING THE SAME

[75] Inventor: Carl E. Spaeder, Jr., Monroeville, Pa.

[73] Assignee: United States Steel Corp., Pittsburgh, Pa.

[22] Filed: Oct. 15, 1973

[21] Appl. No.: 406,738

Related U.S. Application Data

[62] Division of Ser. No. 295,390, Oct. 5, 1972, Pat. No. 3,820,212.

[52] U.S. Cl. ............................................. 29/129.5
[51] Int. Cl. .......................................... B21b 31/08
[58] Field of Search .................. 29/132, 129.5, 110

[56] References Cited
UNITED STATES PATENTS

| | | | |
|---|---|---|---|
| 228,842 | 6/1880 | Totten | 29/129.5 |
| 281,597 | 7/1883 | Wilmot | 29/129.5 |
| 3,014,266 | 12/1961 | Samuels et al. | 29/130 X |
| 3,138,338 | 6/1964 | McKenna | 29/132 X |
| 3,577,619 | 5/1971 | Strandel | 29/132 X |
| 3,718,956 | 3/1973 | Sekimoto et al. | 29/129.5 X |

*Primary Examiner*—Alfred R. Guest
*Attorney, Agent, or Firm*—Walter P. Wood

[57] ABSTRACT

A composite roll which has a hard wear resistant shell and a tough shock resistant arbor, and a method of forming the same. The shell is adhesively affixed to the arbor, thus avoiding a shrink fit which places the shell under tension. The roll is adapted for use in applications where the arbor-shell interface reaches temperatures up to 400F, and the adhesive must withstand these temperatures without breaking down. The preferred adhesive is a thermosetting epoxy material cured at an elevated temperature with an aromatic diamine.

5 Claims, 1 Drawing Figure

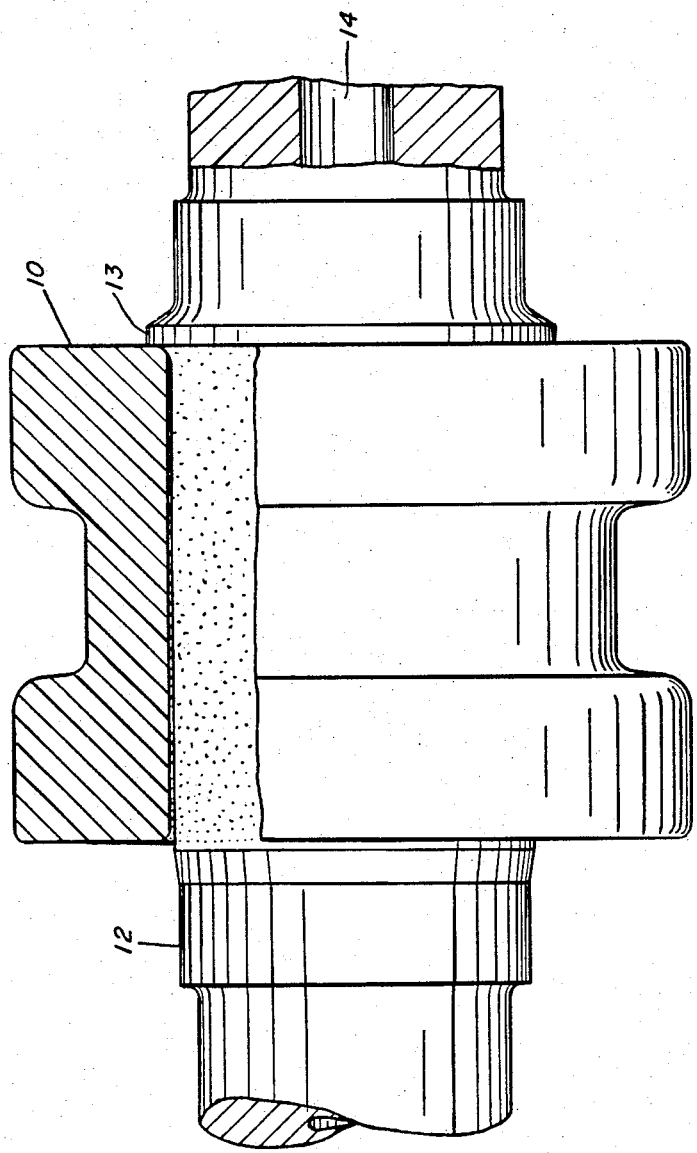

COMPOSITE ROLL AND METHOD OF FORMING THE SAME

This is a division of application Ser. No. 295,390, filed Oct. 5, 1972 (now U.S. Pat. No. 3,820,212).

This invention relates to an improved composite roll construction and to a method of forming composite rolls.

Rolls constructed in accordance with my invention are particularly useful as work rolls for hot-rolling steel blooms or billets, but their use is not thus limited. For example, they may be used as work rolls or backup rolls for hot or cold rolling other metals or other shapes of steel, as guide rolls in a continuous-casting machine, or even as conveyor rolls. Composite rolls which have a hard shell to resist wear and a tough core or arbor to resist shock are known. Heretofore, such rolls have been formed either by shrink-fitting the shell on the arbor or by pouring the metals of the arbor and shell separately into a mold as the roll is cast. Reference may be made to Totten U.S. Pat. No. 228,842, Wilmot U.S. Pat. No. 281,597, Samuels et al. U.S. Pat. No. 3,014,266, or Deperthes U.S. Pat. No. 3,143,012 for exemplary showings of the former practice, and to Harris U.S. Pat. No. 517,747, Henry U.S. Pat. No. 1,011,430 or Hachisu et al. U.S. Pat. No. 3,659,323 for exemplary showings of the latter practice.

A hard wear-resistant shell of course lacks toughness and has poor tensile properties. When such a shell is shrink-fitted over an arbor, it is placed under a residual tensile stress which may cause it to break. When a shell and arbor are cast together of different metals, there is no assurance that the shell is free of residual stresses. The shell is metallurgically bonded to the arbor, and cannot be separately replaced when worn or otherwise damaged.

An object of the present invention is to provide an improved composite roll and method of forming the same in which I overcome the foregoing difficulties.

A further object is to provide an improved composite roll and forming method in which the hard metal shell is free of residual tensile stresses, yet is replaceable on the arbor when worn.

A more specific object is to provide an improved composite roll and forming method in which I affix a hard metal shell to an arbor of tough metal adhesively, specifically avoiding either a shrink fit or a metallurigical bond, the adhesive I use being of a composition capable of withstanding any temperature encountered at the arbor-shell interface.

In the drawing:

The single FIGURE is a side elevational view, with the shell partly broken away, of a composite roll constructed in accordance with my invention.

The FIGURE shows a roll intended for use as a work roll of an in-line rolling mill which follows a continuous billet-casting machine. The specific configuration of the roll to adapt it for this purpose is not intended to limit the invention. The roll includes a shell 10 and an arbor 12. The shell 10 is of a hard wear-resistant metal, for example acicular iron. The arbor 12 is of a tough shock-resistant metal, for example AISI 4340 steel. The arbor has a flange 13 at one end of its body portion and an axial bore 14. The shell abuts the flange, and according to my invention, is affixed to the body of the arbor with a suitable adhesive, as explained hereinafter. Water or air circulates through the bore to prevent the roll, and particularly the adhesive, from overheating. The arbor could be solid in a roll not exposed to high temperatures, or in a roll in which the arbor-shell interface is prevented from overheating by applying water externally.

The adhesive which I use to affix the shell to the arbor must afford sufficient shear strength to prevent slippage therebetween at any temperature reached at the arbor-shell interface, preferably with a reasonable margin of safety. In the example of a work roll for hot-rolling steel blooms or billets, the interface commonly reaches temperatures in the range of about 150°–300°F. My preferred adhesive for this type of roll is a thermosetting epoxy material which cures at a temperature within the range of about 212° to 400°F. As a general rule, adhesives which withstand such temperatures require curing at comparable temperatures.

In more detail my preferred adhesive consists of an epoxy resin, a curing agent, a filler, and in this instance a gelling agent to prevent the adhesive from running before it is cured. Reference can be made to Smeal U.S. Pat. No. 3,532,653 of common ownership for a disclosure of adhesives of this type, but which cure at room temperature. To obtain an otherwise similar adhesive which cures at elevated temperatures, I substitute for the curing agents disclosed in the patent an aromatic diamine, which I use in stoichiometric relation to the epoxy. Specific examples of suitable aromatic diamine curing agents are para para' diamino diphenylmethane, methaphenylene diamine, toluene diamine, and diamino diphenyl sulfone, which I may use either by themselves or in combination with one another. The preferred epoxy component is any of the glycidal polyethers of dihydric phenols disclosed in the Smeal patent. The preferred filler is talc, kaolin or any of the other fillers disclosed in the patent. The preferred gelling agent is short fibre asbestos or bentonite clay. One adhesive within the foregoing composition which I have used successfully in practice is available commercially from United States Steel Corporation under the trademark "Nexus Adhesive SX 8021". For rolls in which the arbor-shell interface is not subject to temperatures above about 212°F, the adhesives disclosed in the Smeal patent are satisfactory.

According to my method of forming the roll, I machine the inside face of the shell or the outside face of the arbor to provide a total clearance therebetween based on diameter of about 0.003 to 0.005 inch when the parts are at room temperature. These limits are fairly critical. If there is too much clearance at the interface, the adhesive cannot form a proper bond. If there is insufficient clearance, a shrink fit may be obtained. I clean the surface of the shell and arbor and apply the adhesive to the surface of the arbor. When the adhesive is one which cures at elevated temperature, I heat the shell to a temperature of about 350° to 400°F, or about 50° to 100°F above the optimum curing temperature for the adhesive. When the adhesive is one which cures at room temperature, optionally I may also apply a light coating to the interior surface of the shell for room temperature adhesion. I may stand the arbor on end with the flange 13 down and lower the shell over the arbor. I do not heat the arbor except from its proximity to the heated shell. Alternatively I may stand the heated shell on end and lower the arbor into the shell. I can suspend the arbor from the flanged end with a fixture engaged with its bore. As I assemble the shell and the arbor, I rotate one or the other to spread the adhesive uniformly. The heat in the shell serves to cure the adhesive. Heating the shell also expands the shell and facilitates assembling the shell on the arbor, since the clearance at room temperature is quite small. Adhesives which cure at elevated temperatures should cool slowly to effect proper curing. Preferably I wrap the assembled roll in asbestos or pass steam through the bore 14 to retard cooling and thus effect better curing of the adhesive. Finally I dress the outside of the shell to its finished dimensions.

If it is inconvenient to heat the shell to a sufficient temperature to cure the adhesive, as an alternative I may assemble the unheated shell on the arbor and inject steam, boiling water or other fluid into the bore of the arbor. As another alternative, I may assemble the parts unheated and place the entire assembly in a furnace, which I heat slowly to the curing temperature. Very slow heating is necessary to prevent rupturing of the adhesive bond, as might occur when a massive assembly, such as composite roll, is heated non-uniformly.

A specific example of a work roll for hot-rolling steel billets in an in-line rolling mill following a continuous-casting apparatus is as follows:

The roll was of a configuration as illustrated in the drawing. The arbor was AISI 4340 steel, and the portion to be contacted by the shell had a diameter of 9.000 inches at room temperature. The shell was acicular iron. I machined the inside surface of the shell to provide a clearance throughout within the range of 0.03 to 0.005 inch based on diameter of the arbor. I coated the arbor with a thermosetting epoxy adhesive. The epoxy component of the adhesive was diglycidal ether of bis-phenol A, epoxy equivalent 182 to 195, viscosity 5000 to 10,000 centipoises. The filler was a mixture of dolomite and aluminum silicate. The curing agent was para para' diamino diphenylmethane. I mixed the epoxy component and curing agent in stoichiometric proportions, as is conventional practice, and applied the material to the arbor. I heated the shell to 400F and placed it over the arbor, relatively rotating the parts as I did so to spread the adhesive uniformly throughout the interface. I wrapped the assembled arbor and shell with asbestos to retard cooling, whereby the roll cooled to room temperature after about 8 hours. Finally I dressed the outside of the shell uniformly to its specified dimensions.

I placed a number of rolls thus constructed in service in an in-line rolling mill, in which I hot-rolled steel billets coming from a continuous-casting apparatus. The arbor-shell interface reached a temperature of about 250°F in this operation. To date several such rolls have been in service for over six months without breaking down. Similar rolls in which the shell is shrink-fitted on the arbor (no adhesive) have shown erratic performance. The acicular iron shell often breaks within a day or so. Such shell is needed for wear resistance in this operation. Forged rolls require frequent dressing, and likewise are unsatisfactory.

As already stated, I carefully avoid any shrink-fit of the shell on the arbor, and thus prevent any residual tensile stress in the shell. As long as my preferred elevated temperature adhesive is maintained at a temperature no higher than about 300°F, it does not break down, but affords a satisfactory bond between the shell and the arbor. By circulating water through the bore 14, I can readily maintain the temperature sufficiently low, even when hot rolling steel at temperatures above 2,000°F. When the shell becomes worn or is otherwise damaged, it is readily removed from the arbor and replaced. I am aware that it is known to affix rubber or wood shells to roll bodies with an adhesive, but I believe it is altogether surprising that a hard metal shell can be fixed to an arbor in this manner to form a work roll capable of withstanding temperatures to which a roll is subjected in hot rolling steel.

I claim:

1. A composite roll comprising a shell of hard wear-resistant metal and an arbor of tough shock-resistant metal, said shell being fixed to said arbor with an adhesive applied between the body of the arbor and the inside surface of the shell, said shell having sufficient clearance with the body of the arbor at room temperature to avoid a shrink fit and resulting tensile stresses in the shell.

2. A roll as defined in claim 1 in which said shell is of acicular iron.

3. A roll as defined in claim 1 in which said adhesive is an amine-cured thermosetting epoxy material capable of withstanding a temperature of at least 300°F.

4. A roll as defined in claim 1 in which said arbor has a flange abutted by said shell and a bore for circulating cooling fluid.

5. A roll defined in claim 1 in which the clearance between said shell and the body of said arbor based on diameter is 0.003 to 0.005 inch at room temperature.

* * * * *